US010442979B2

(12) United States Patent
Abdallah et al.

(10) Patent No.: US 10,442,979 B2
(45) Date of Patent: Oct. 15, 2019

(54) INJECTION FLUID TUNING

(71) Applicants: Wael Abdallah, Dhahran (SA); Mikhail Stukan, Moscow (RU); Reza Taherian, Missouri City, TX (US); Maxim Fedorov, Germany (DE)

(72) Inventors: Wael Abdallah, Dhahran (SA); Mikhail Stukan, Moscow (RU); Reza Taherian, Missouri City, TX (US); Maxim Fedorov, Germany (DE)

(73) Assignees: SCHLUMBERGER TECHNOLOGY CORPORATION, Sugar Land, TX (US); UNIVERSITY OF STRATHCLYDE, Glasgow (GB)

( * ) Notice: Subject to any disclaimer, the term of this patent is extended or adjusted under 35 U.S.C. 154(b) by 481 days.

(21) Appl. No.: 14/733,580

(22) Filed: Jun. 8, 2015

(65) Prior Publication Data
US 2016/0356126 A1 Dec. 8, 2016

(51) Int. Cl.
*E21B 41/00* (2006.01)
*C09K 8/58* (2006.01)
*E21B 49/00* (2006.01)
*E21B 43/16* (2006.01)
*E21B 43/25* (2006.01)

(52) U.S. Cl.
CPC ................ *C09K 8/58* (2013.01); *E21B 43/16* (2013.01); *E21B 43/25* (2013.01)

(58) Field of Classification Search
None
See application file for complete search history.

(56) References Cited

U.S. PATENT DOCUMENTS

| 5,042,580 | A | 8/1991 | Cullick et al. | |
| 2010/0096129 | A1* | 4/2010 | Hinkel | E21B 43/16 166/270.1 |
| 2012/0085555 | A1* | 4/2012 | Collins | C09K 8/58 166/400 |

FOREIGN PATENT DOCUMENTS

| WO | WO2011038745 A1 | 4/2011 |
| WO | WO2012054150 A1 | 4/2012 |
| WO | WO2015044445 A1 | 4/2015 |

OTHER PUBLICATIONS

Swenson, P. D. et al., "A Novel Centrifugal Method for Wettability Characterization of Granulates", Industrial & Engineering Chemistry Research, 2011, 50(9), pp. 5565-5574.
(Continued)

*Primary Examiner* — Jeffrey D Washville

(57) ABSTRACT

Injection fluid tuning is provided. In one possible implementation, injection fluid can be tuned by accessing both surface properties of rock found in a hydrocarbon reservoir of interest and a chemical composition of oil found in the reservoir of interest. An ion effect on wettability of a contact surface of the rock can be acquired and then used to formulate a tuned ion solution based on the ion effect on wettability of the contact surface of the rock. In another possible implementation, an electrolyte solution has an ionic composition and an ionic concentration configured to enhance recovery of oil from a reservoir. The electrolyte solution includes a content of direct contact ions including monovalent ions with a static polarizability larger than a preset limit sufficient to influence a contact surface of a rock in the reservoir to reach a desired wettability.

8 Claims, 5 Drawing Sheets

(56) References Cited

OTHER PUBLICATIONS

Bortolotti, V. et al., "Intermittent Alkali Flooding in Vertical Carbonate Reservoirs". Paper SPE 121832 presented at the EUROPEC/EAGE Annual Conference and Exhibition, Amsterdam, The Netherlands, 2009, pp. 1-11.
Ligthelm, D. J. et al., "Novel Waterflooding Strategy by Manipulation of Injection Brine Composition", Paper SPE 119835, presented at the EUROPEC/EAGE Annual Conference and Exhibition, Amsterdam, The Netherlands, 2009, pp. 1-22.
International Search Report and Written Opinion of PCT Application No. PCT/US2016/033991 dated Sep. 20, 2016, pp. 1-17.

* cited by examiner

INJECTION FLUID TUNING

BACKGROUND

Current oilfield technologies can only produce a fraction of downhole oil associated with a well. For example, only 30% of the oil associated with an average well in the US can be produced. This means that 70% of the downhole oil associated with existing American wells (an estimated 89 billion barrels) is still waiting to be produced.

Many organizations around the globe are currently looking into enhanced oil recovery (EOR) technologies to recover additional oil from existing wells. A variety of EOR technologies exist that can be tailored in various combinations to increase production from individual reservoirs.

However, in the case of carbonate reservoirs, such tailoring efforts can be complex, often involving extensive trial and error to determine an effective blend of EOR technologies. Such trial and error can be time consuming and costly.

SUMMARY

Injection fluid tuning is provided. In one possible implementation, injection fluid can be tuned by accessing both surface properties of rock found in a hydrocarbon reservoir of interest and a chemical composition of oil found in the reservoir of interest. An ion effect on wettability of a contact surface of the rock can be acquired and then used to formulate a tuned ion solution based on the ion effect on wettability of the contact surface of the rock.

In another possible implementation, an electrolyte solution has an ionic composition and an ionic concentration configured to enhance recovery of oil from a reservoir. The electrolyte solution includes a content of direct contact ions including monovalent ions with a static polarizability larger than a preset limit sufficient to influence a contact surface of a rock in the reservoir to reach a desired wettability.

In another possible implementation, a computer-readable tangible medium includes instruction that direct a processor to access one or more properties of a type of rock in a hydrocarbon reservoir. Instructions are also present that direct the processor to acquire an ion effect on wettability of a contact surface of the rock and formulate a tuned ion solution with a content of direct contact ions sufficient to increase a water wetness of the contact surface of the rock.

This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

Additionally, some examples discussed herein involve technologies associated with the oilfield services industry. It will be understood however that the techniques of Injection fluid tuning may also be useful in a wide range of industries outside of the oilfield services sector, including for example, mining, geological surveying, medical imaging, etc.

As described herein, various techniques and technologies associated with injection fluid tuning can facilitate the design of a tuned ion solution configured to improve oil recovery from a reservoir by altering a surface wettability of rock in the reservoir and/or modifying a surface energy between a crude oil and the tuned ion solution. In one possible implementation, the tuned ion solution can have a defined ion content. In another possible implementation, the tuned ion solution can have a defined ion content and a defined salinity.

In another possible implementation, an ion chemical composition and concentration of ions in the tuned ion solution can be tailored for a variety of well/reservoir conditions, including, for example, temperature, pressure, chemical composition of oil in the reservoir, brine pH, rock geometry (including pore size distribution) and chemical structure of reservoir minerals, etc.

Example Wellsite

Figure 1:
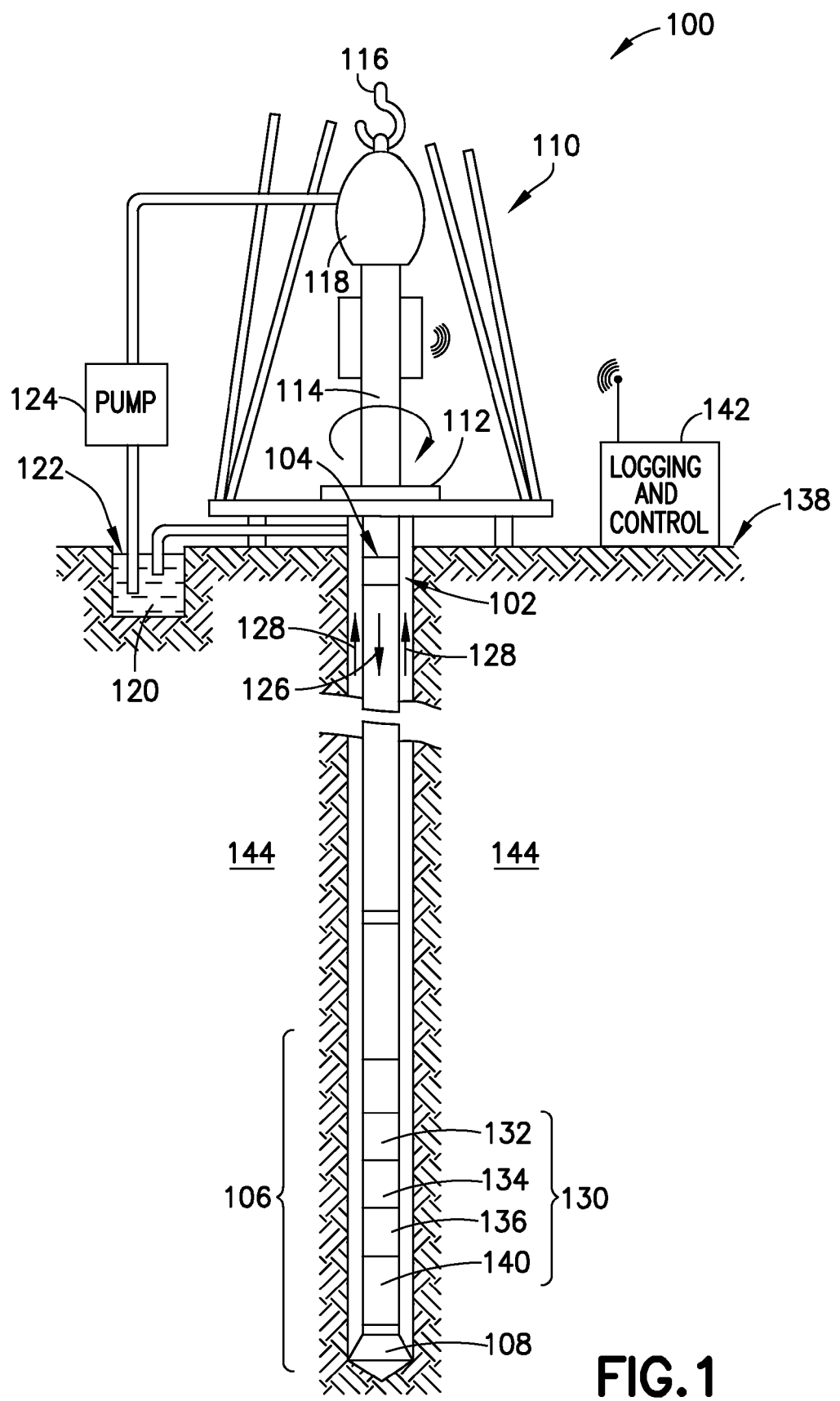
FIG. 1 illustrates an example wellsite in which embodiments of injection fluid tuning can be employed.

FIG. 1 illustrates a wellsite 100 in which embodiments of Injection fluid tuning can be employed. Wellsite 100 can be onshore or offshore. In this example system, a borehole 102 is formed in a subsurface formation by rotary drilling in a manner that is well known. Embodiments of Injection fluid tuning can also be employed in association with wellsites where directional drilling is being conducted.

A drill string 104 can be suspended within borehole 102 and have a bottom hole assembly 106 including a drill bit 108 at its lower end. The surface system can include a platform and derrick assembly 110 positioned over the borehole 102. The assembly 110 can include a rotary table 112, kelly 114, hook 116 and rotary swivel 118. The drill string 104 can be rotated by the rotary table 112, energized by means not shown, which engages kelly 114 at an upper end of drill string 104. Drill string 104 can be suspended from hook 116, attached to a traveling block (also not shown), through kelly 114 and a rotary swivel 118 which can permit rotation of drill string 104 relative to hook 116. As is well known, a top drive system can also be used.

In the example of this embodiment, the surface system can further include drilling fluid or mud 120 stored in a pit 122 formed at wellsite 100. A pump 124 can deliver drilling fluid 120 to an interior of drill string 104 via a port in swivel 118, causing drilling fluid 120 to flow downwardly through drill string 104 as indicated by directional arrow 126. Drilling fluid 120 can exit drill string 104 via ports in drill bit 108, and circulate upwardly through the annulus region between the outside of drill string 104 and wall of the borehole 102, as indicated by directional arrows 128. In this well-known manner, drilling fluid 120 can lubricate drill bit 108 and carry formation cuttings up to the surface as drilling fluid 120 is returned to pit 122 for recirculation.

Bottom hole assembly 106 of the illustrated embodiment can include drill bit 108 as well as a variety of equipment 130, including a logging-while-drilling (LWD) module 132, a measuring-while-drilling (MWD) module 134, a rotosteerable system and motor, various other tools, etc.

In one possible implementation, LWD module 132 can be housed in a special type of drill collar, as is known in the art, and can include one or more of a plurality of known types of logging tools (e.g., a nuclear magnetic resonance (NMR) system), a directional resistivity system, and/or a sonic logging system). It will also be understood that more than one LWD and/or MWD module can be employed (e.g. as represented at position 136). (References, throughout, to a module at position 132 can also mean a module at position 136 as well). LWD module 132 can include capabilities for measuring, processing, and storing information, as well as for communicating with surface equipment.

MWD module 134 can also be housed in a special type of drill collar, as is known in the art, and include one or more devices for measuring characteristics of the well environment, such as characteristics of the drill string and drill bit. MWD module 134 can further include an apparatus (not shown) for generating electrical power to the downhole system. This may include a mud turbine generator powered by the flow of drilling fluid 120, it being understood that other power and/or battery systems may be employed. MWD module 134 can include one or more of a variety of measuring devices known in the art including, for example, a weight-on-bit measuring device, a torque measuring device, a vibration measuring device, a shock measuring device, a stick slip measuring device, a direction measuring device, and an inclination measuring device.

Various systems and methods can be used to transmit information (data and/or commands) from equipment 130 to a surface 138 of the wellsite 100. In one implementation, information can be received by one or more sensors 140. The sensors 140 can be located in a variety of locations and can be chosen from any sensing and/or detecting technology known in the art, including those capable of measuring various types of radiation, electric or magnetic fields, including electrodes (such as stakes), magnetometers, coils, etc.

In one possible implementation, sensors 140 receive information from equipment 130, including LWD data and/or MWD data, which can be utilized for a variety of purposes including steering drill bit 108 and any tools associated therewith, characterizing a formation surrounding borehole 102, characterizing fluids within wellbore 102, etc.

In one implementation a logging and control system 142 can be present. Logging and control system 142 can receive and process a variety of information from a variety of sources, including equipment 130. Logging and control system 142 can also control a variety of equipment, such as equipment 130 and drill bit 108.

Logging and control system 142 can also be used with a wide variety of oilfield applications, including logging while drilling, artificial lift, measuring while drilling, wireline, etc. Also, logging and control system 142 can be located at surface 138, below surface 138, proximate to borehole 102, remote from borehole 102, or any combination thereof.

Alternately, or additionally, information received by sensors 140 can be processed at one or more other locations, including any configuration known in the art, such as in one or more handheld devices proximate and/or remote from the wellsite 100, at a computer located at a remote command center, in the logging and control system 142 itself, etc.

In one possible implementation, one or more injection wells similar to borehole 102 can exist in proximity to wellsite 100. Injection fluids, such as the tuned ion solution disclosed herein, can be injected into these adjacent wells such that the injection fluid can migrate through reservoir 144 to borehole 102, improving production of oil from reservoir 144 into wellbore 102.

Example Computing Device

Figure 2:
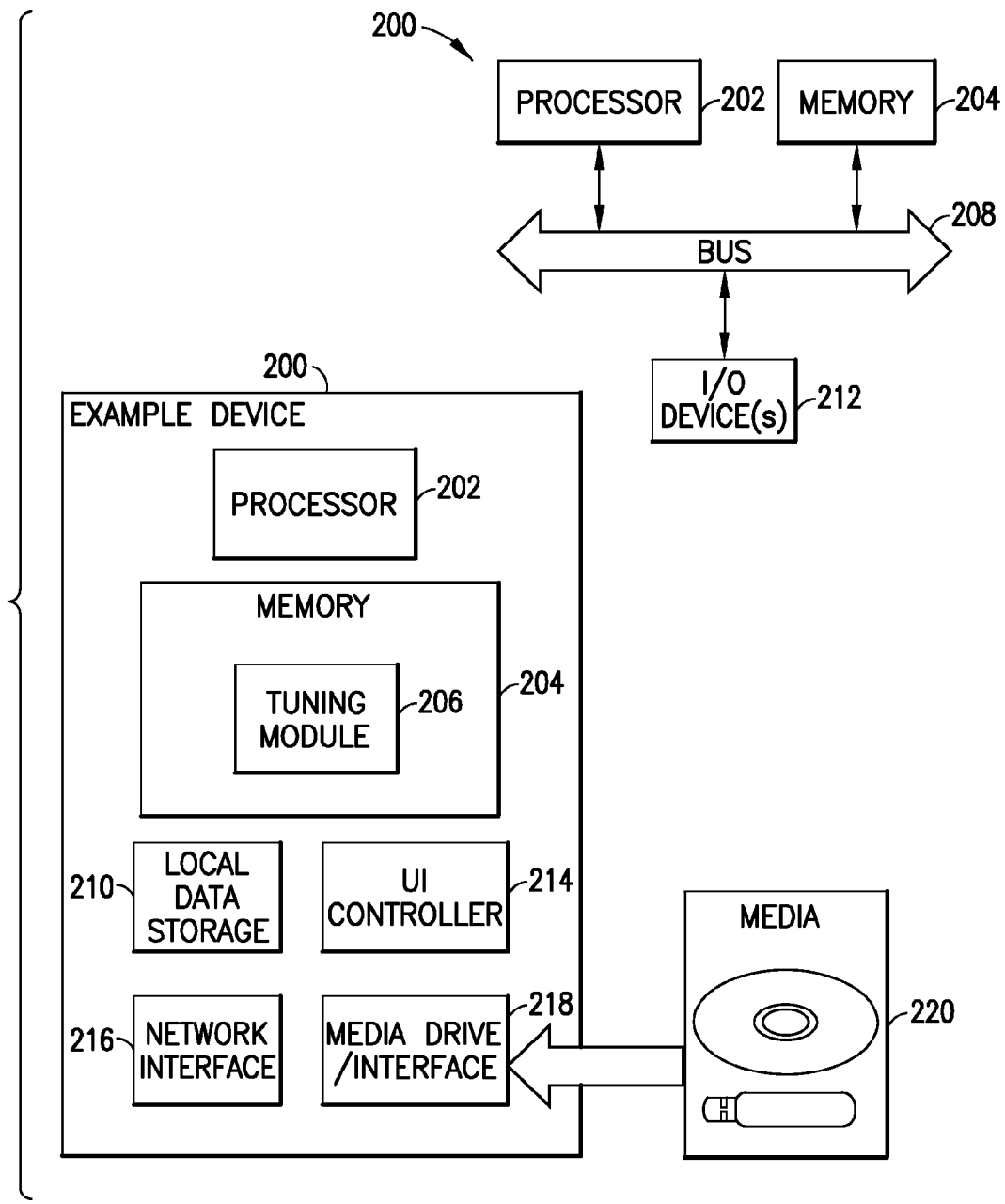
FIG. 2 illustrates an example computing device that can be used in accordance with various implementations of injection fluid tuning.

FIG. 2 illustrates an example device 200, with a processor 202 and memory 204 for hosting a tuning module 206 configured to implement various embodiments of injection fluid tuning as discussed in this disclosure. Memory 204 can also host one or more databases and can include one or more forms of volatile data storage media such as random access memory (RAM), and/or one or more forms of nonvolatile storage media (such as read-only memory (ROM), flash memory, and so forth).

Device 200 is one example of a computing device or programmable device, and is not intended to suggest any limitation as to scope of use or functionality of device 200 and/or its possible architectures. For example, device 200 can comprise one or more computing devices, programmable logic controllers (PLCs), etc.

Further, device 200 should not be interpreted as having any dependency relating to one or a combination of components illustrated in device 200. For example, device 200 may include one or more of a computer, such as a laptop computer, a desktop computer, a mainframe computer, etc., or any combination or accumulation thereof.

Device 200 can also include a bus 208 configured to allow various components and devices, such as processors 202, memory 204, and local data storage 210, among other components, to communicate with each other.

Bus 208 can include one or more of any of several types of bus structures, including a memory bus or memory controller, a peripheral bus, an accelerated graphics port, and a processor or local bus using any of a variety of bus architectures. Bus 208 can also include wired and/or wireless buses.

Local data storage 210 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 212 may also communicate via a user interface (UI) controller 214, which may connect with I/O device(s) 212 either directly or through bus 208.

In one possible implementation, a network interface 216 may communicate outside of device 200 via a connected network, and in some implementations may communicate with hardware, such as one or more sensors 140, etc.

In one possible embodiment, sensors 140 may communicate with system 200 as input/output device(s) 212 via bus 208, such as via a USB port, for example.

A media drive/interface 218 can accept removable tangible media 220, such as flash drives, optical disks, removable hard drives, software products, etc. In one possible implementation, logic, computing instructions, and/or software programs comprising elements of tuning module 206 may reside on removable media 220 readable by media drive/interface 218.

In one possible embodiment, input/output device(s) 212 can allow a user to enter commands and information to device 200, and also allow information to be presented to the user and/or other components or devices. Examples of input device(s) 212 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of tuning module 206 may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

Example System(s)

Surface wettability of rocks in a reservoir, such as reservoir 144, can be a factor in oil production. For example, more than 80% of carbonate rock formations are moderate to strongly oil-wet. In one possible implementation, a rock surface can become oil-wet (or more oil-wet) through adsorption of polar compounds, such as those found in oil. Polar compounds can include, for example, carboxylic acids, naphthenic acids, asphaltenes, etc. In some instances, adsorption of polar compounds can alter the originally hydrophilic properties of a rock surface to a more hydrophobic nature. This can lower oil relative permeability and result in poor displacement efficiency of oil in the reservoir.

Figure 3:
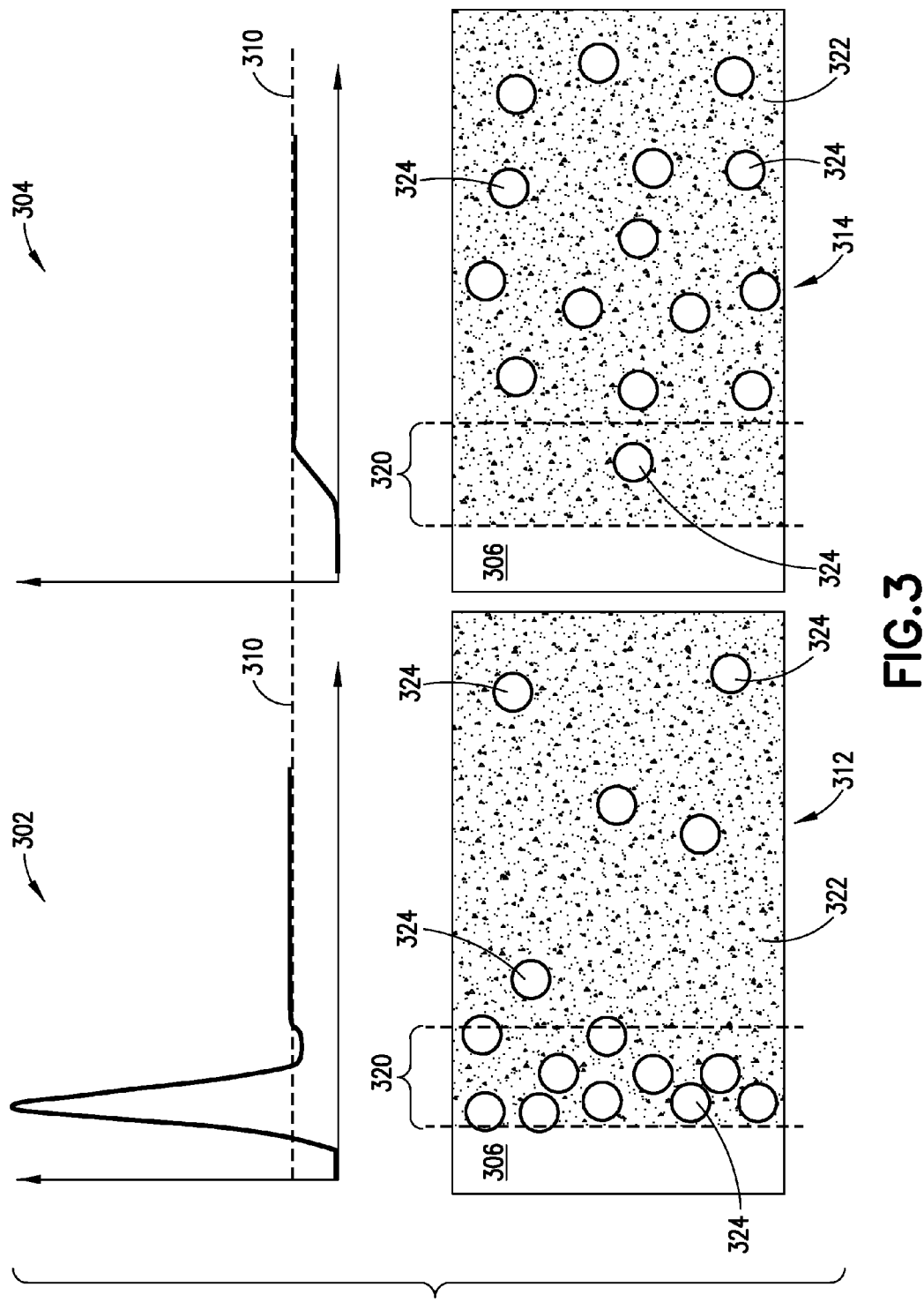
FIG. 3 illustrates various ion effects on interfacial surface tension in accordance with implementations of injection fluid tuning.

FIG. 3 illustrates various ion effects on interfacial surface tension in accordance with implementations of injection fluid tuning Graphs 302 and 304 plot ion concentration (vertical axis) versus perpendicular distance from a contact surface 306 (horizontal axis). Ion concentration can be measured and/or represented in any units possible, including, for example, moles/liter, etc. In one possible implementation, contact surface 306 can include the surface of a rock in reservoir 144, including, for example, the inside of a pore, fissure, crack, etc. In another possible implementation, contact surface 306 can include any compartment where ion concentration is low and/or close to zero (including, for example, a non-polar fluid such as oil, etc.).

Graph 302 illustrates a condition in which an ion concentration at contact surface 306 is enriched in comparison to an average bulk value ion concentration 310 in a fluid contacting contact surface 306. Graph 304 illustrates a depletion of ion concentration at contact surface 306 in comparison to average bulk value ion concentration 310 in a fluid contacting contact surface 306.

Molecular-scale pictures 312, 314 illustrate ion distribution at an interfacial layer 320 defined by contact surface 306 and a tuned ion solution 322 in contact with contact surface 306. In one possible implementation, tuned ion solution fluid 322 can be engineered to affect a wettability of contact surface 306. In another possible implementation, tuned ion solution fluid 322 can be engineered to affect a level of interfacial energy between oil and tuned ion solution 322. In yet another possible implementation, tuned ion solution fluid 322 can be engineered to affect a wettability of contact surface 306 and a level of interfacial energy between oil and tuned ion solution 322. It will be understood that in some implementations, well fluids (including oil, water, etc.) may also be present in, and/or in addition to, tuned ion solution 322.

In one possible implementation, tuned ion solution 322 can be an aqueous solution engineered to have a specific ionic composition with a specific content of ions. For example, in one possible embodiment, a specific content of direct contact ions suitable for making direct contact with charged groups of ions on contact surface 306 can be present to encourage the creation of a water-wet condition on contact surface 306. Interfacial properties of ions (including, for example, their surface affinity) can depend on a polarizability of the ions. Therefore, in one possible embodiment, direct contact ions can include any anions with static polarizability larger than $3.4 \times 10^{-30}$ m$^3$ and/or any cations with static polarizability larger than $1.9 \times 10^{-30}$ m$^3$. For instance, direct contact ions can include any cations and/or anions larger than a chloride ion, such as, for example, bromide ions, iodide ions, etc.

In another possible embodiment, a specific content of non-contact ions engineered to stay separated from charged groups of ions on contact surface 306, can be present, such that a wetness condition of contact surface 306 is not affected by tuned ion solution 322.

In one possible aspect, tuned ion solution 322 can also have an engineered salinity range.

Tuned ion solution 322 can be placed in contact with contact surface 306 through various techniques, including water flooding.

As shown in graph 302 and picture 312, in one possible implementation, if a concentration of ions 324 in fluid 322 is enriched at interface 320 compared to an average concentration of the ions 324 in bulk value 310, a decrease in surface tension can result.

In another possible implementation, as shown in graph 304 and picture 314, if ions 324 are depleted from contact surface 306 compared to an average bulk concentration of ions 324 in bulk value 310, an increase in surface tension can result.

In some possible implementations, surface wettability of contact surface 306 can act to restrict access and/or cause earlier water breakthrough to oil reserves in reservoir 144. In one possible embodiment, oil-wetness of contact surface 306 can be overcome by directly altering one or more surface properties of the rock to make contact surface 306 water-wet. This can reduce drag forces and capillary number, supporting water imbibition into pores in the rock by positive capillary pressure, thus improving oil recovery from reservoir 144.

In one possible implementation, injection of tuned ion solution 322 into reservoir 144 can reduce a concentration of adsorbed polar species (such as carboxylic acids, asphaltenes, etc.) on contact surface 306 in reservoir 144, including rock surfaces within pore matrices.

Injection of tuned ion solution 322 into reservoir 144, can also reduce a possibility of further polar species adsorption by rock in reservoir 144. In one possible aspect, this can increase a mobility of oil in a formation in reservoir 144 due to wettability alteration of surfaces 306 in the formation from oil-wet to water-wet, allowing the oil to be more easily removed from pores in the rock.

In one possible embodiment, a combination of ions in tuned ion solution 322 can lead to "cooperative work" of ions 324 in altering a wettability of a mineral, such as, for example, calcite. For example, affinities between materials such as sulfate, calcium, magnesium, sodium, etc., can change a morphology of contact surface 306 when the materials are present in various ratios.

In one possible embodiment, a tuned ion solution 322 with a low salinity (such as, for example, 5 kppm of monovalent ions and 1 kppm of similar monovalent ions) can encourage recovery of oil from rock in reservoir 144. In one possible aspect, tuned ion solution 322 can include a brine mixture with a low salinity along with an engineered content of direct contact ions to create conditions on contact surface 306 that are more amenable to increasing recovery of oil from reservoir 144 by helping to mobilize residual oil in the rock within reservoir 144.

In one possible embodiment, the effect of a particular ion composition on an interfacial surface tension of tuned ion solution 322 can be associated with adsorption or desorption of ions at interface 320 of tuned ion solution 322 and contact surface 306. For instance, different ionic species in tuned ionic solution 322 can influence interfacial surface tension of polar and non-polar fluids and their mixtures/dispersions in various ways. For example direct contact ions can decrease surface tension while non-contact ions can increase surface tension. In one possible aspect, factors such as temperature, pressure, chemical composition, pH of tuned ion solution 322 in which the ions 324 are found, concentration of ions 324 and overall chemical composition of tuned ion solution 322, etc., can also have an effect on the surface tension.

In one possible embodiment, ion adsorption/desorption can be influenced by an affinity of ions 324 to interface 320 as well as an affinity of ions 324 to specific chemical groups on contact surface 306. In one aspect, charges of chemical groups on contact surface 306 can contribute to this influence.

In one possible implementation, some ions 324 can make direct ion pairs with chemical groups on contact surface 306. In one aspect, a concentration of ions 324 on contact surface 306 can be enriched in proportion to the chemical groups available on contact surface 306. Other ions 324 may not be able to make a direct ion pair due to solvent effects (for example, polar solvents may interact with charged chemical groups on contact surface 306 leading to a desolvation penalty).

Figure 4:
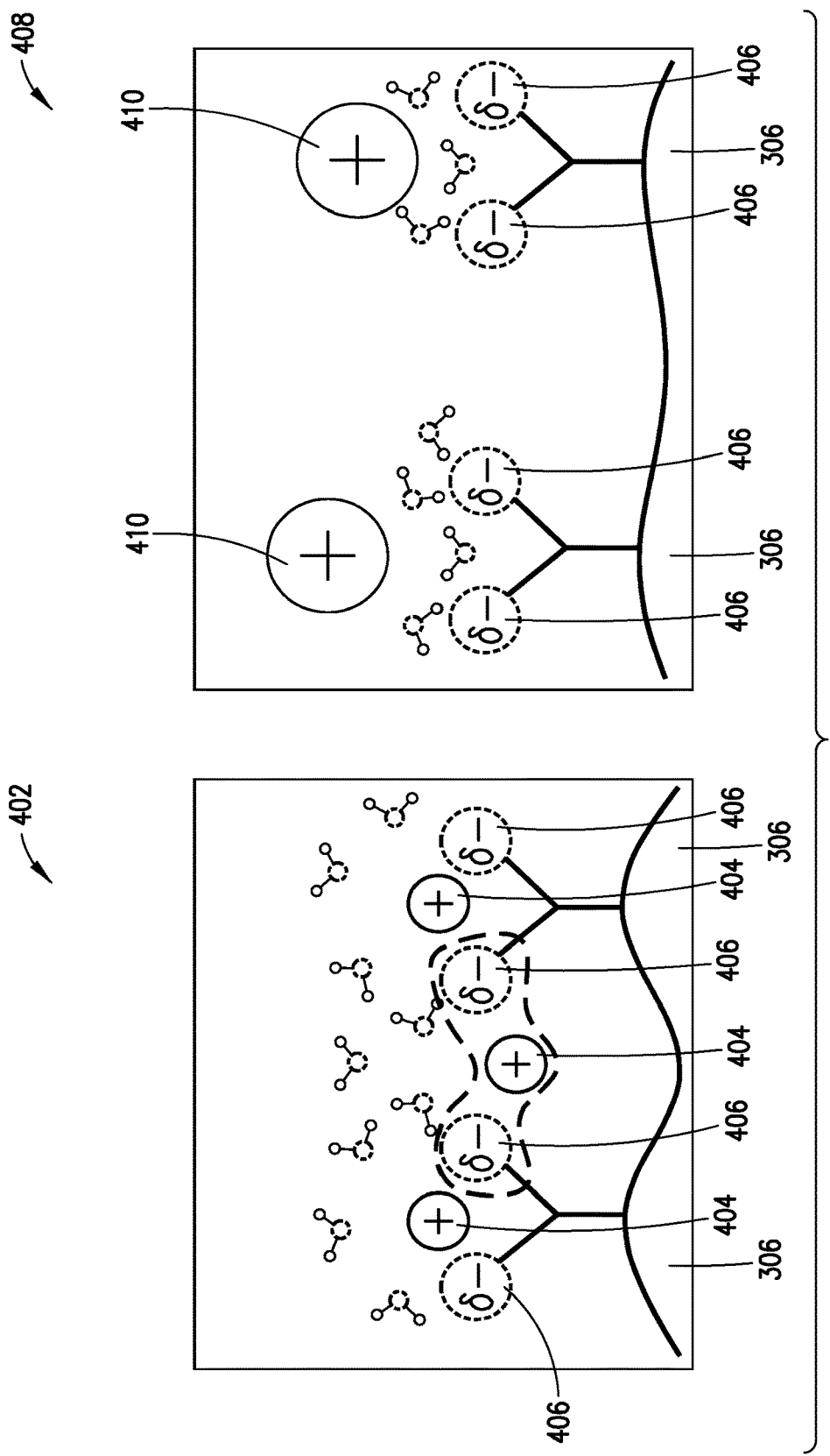
FIG. 4 illustrates various effects of ion pairing with surface groups in accordance with implementations of injection fluid tuning.

FIG. 4 illustrates various effects of ion pairing with surface groups in accordance with implementations of injection fluid tuning In one possible implementation, such as shown in illustration 402, direct ion pair formation can occur when direct contact ions 404 in tuned ion solution 322 exhibit a strong enough affinity to ions 406 at contact surface 306 to make direct contact with ions 406. In such a case, direct contact ions 404 can come from tuned ion solution 322 and substitute solvent at the charged ions 406.

In another possible implementation, such as shown in illustration 408, solvent-separated ion interactions can result when non-contact ions 410 in tuned ion solution 322 exhibit a low enough affinity to ions 406 at contact surface 306 such that the non-contact ions 410 stay in solution and do not substitute solvent at the ions 406. It will be understood that non-contact ions 410, direct contact ions 404, as well as ions 406 at contact surface 306 may be of any polarity, and not just those shown in FIG. 4. Moreover non-contact ions 410 and direct contact ions 404 can comprise ions 324.

In one possible implementation, ion effects on interfacial surface tension can be determined by one or more of ion-ion, ion-fluid, fluid-surface and ion-surface interactions. In one possible implementation, the variety of ion effects on interfacial properties that can influence oil/water wettability of contact surface 306 can include, for example:

1) adsorption/desorption of ions 324;
2) Ion exchange at interface 320 (i.e. ions 324 from solution 322 can substitute ions 406 on contact surface 306, which can lead to alteration of properties of contact surface 306);
3) Formation of salt bridges between charged groups (comprised of groups of ions 406) on contact surface 306 and charged groups of oil components (such as ions in a solution including hydrocarbons);
4) Local change of a pH level at contact surface 306 (for example, adsorption of ions 324 at contact surface 306 can influence water dissociation at contact surface 306, changing a local concentration of H+ and OH− ions). In such an instance, local changes of pH can lead to different protonation states of oil components at contact surface 306 (including compounds with carboxylic groups such as asphaltenes). In some instances, this can alter the oil wetting properties of contact surface 306;
5) Ions 324 can compete with water and surface charged groups of ions 406 for charged or polar groups of oil components (e.g. carboxylic groups). Competitive binding of ions 324 to these chemical groups of oil components can change a free energy of binding of the oil components to contact surface 306. In some instances, this can alter the oil wettability of contact surface 306.

In one possible implementation, an overall net effect of ions 324 on wetting properties of a particular combination of oil and tuned ion solution 322 and contact surface 306 can result from a combination of one or more of the effects listed above. However, in some embodiments, one or two of the effects listed above will be dominant in changing the interfacial properties of the system. In one possible implementation, such dominant effect(s) can result from changes of a composition of ions 324 in fluid 322.

In one possible implementation, an ion composition of tuned ion solution 322 (in terms of types of ions 324 and their concentrations) can be rationally designed and tailored for a particular reservoir of mineral/rock.

In one possible implementation, ion effects on interfacial surface tension and overall rheological properties of fluids in porous media can be determined by a balance of ion-ion, ion-fluid, fluid-surface and ion-surface interactions. Such parameters can be influenced by (1) chemical ion composition of the fluid; (2) ion concentration in the fluid. Thus, tuned ion solution 322 can be engineered to have an ion composition (chemical nature of ions and their concentration) to achieve a variety of results, including improving crude oil recovery from reservoir 144. This can be achieved by one or more of the following:

Modification of interfacial tension between tuned ion solution 322 and oil; and/or tuned ion solution 322 and surface 306; and/or oil and surface 306;
    Modification of rheological properties of tuned ion solution 322 in porous reservoir media;
    Improving stability of emulsions of tuned ion solution 322 and oil; and
    Modifying wetting properties of tuned ion solution 322 with regard to oil and contact surface 306.

Example Methods

Figure 5:
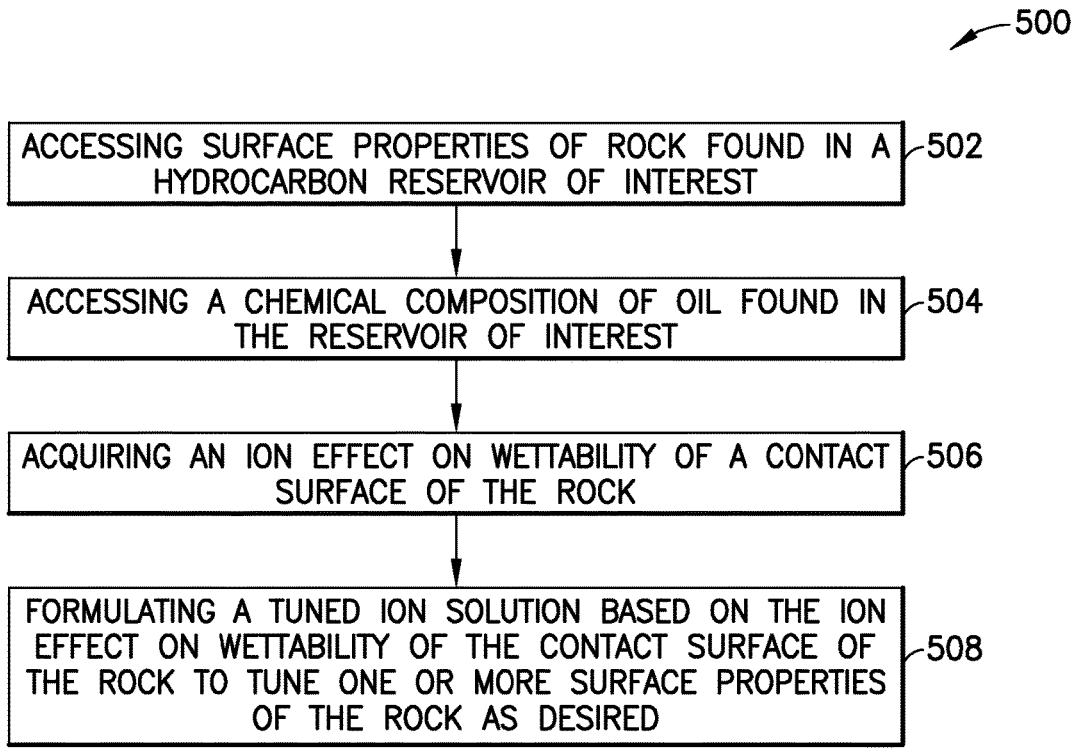
FIG. 5 illustrates an example method associated with injection fluid tuning.
Figure 6:
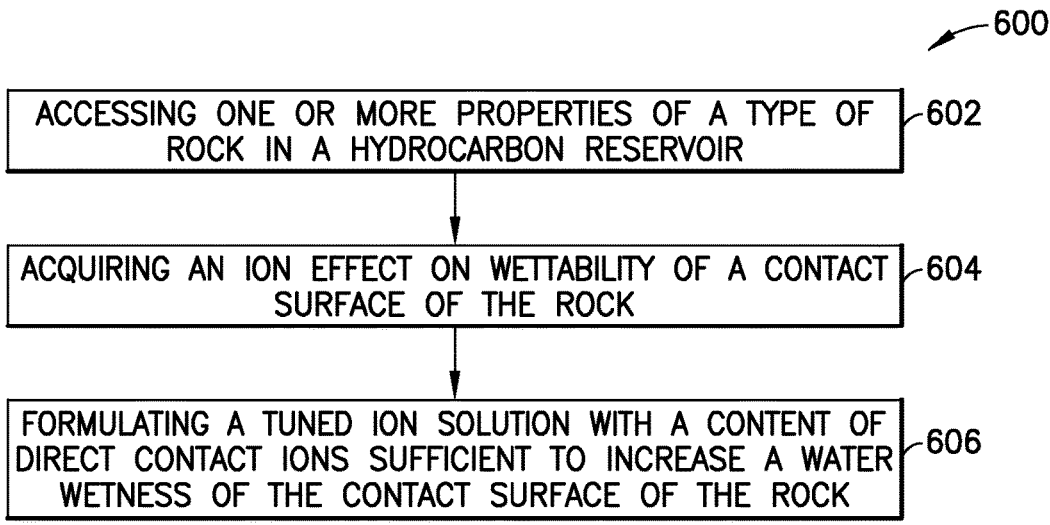
FIG. 6 illustrates an example method associated with injection fluid tuning.

FIGS. 5-6 illustrate example methods for implementing aspects of Injection fluid tuning. The methods are illustrated as a collection of blocks and other elements in a logical flow graph representing a sequence of operations that can be implemented in hardware, software, firmware, various logic or any combination thereof. The order in which the methods are described is not intended to be construed as a limitation, and any number of the described method blocks can be combined in any order to implement the methods, or alternate methods. Additionally, individual blocks and/or elements may be deleted from the methods without departing from the spirit and scope of the subject matter described therein. In the context of software, the blocks and other elements can represent computer instructions that, when executed by one or more processors, perform the recited operations. Moreover, for discussion purposes, and not purposes of limitation, selected aspects of the methods may be described with reference to elements shown in FIGS. 1-4.

FIG. 5 illustrates an example method 500 that can be employed to create a tuned ion solution, such as tuned ion solution 322, to alter a wetness of a surface, such as contact surface 306, and/or affect a level of interfacial energy between oil and the tuned ion solution.

At block 502, surface properties, such as properties of contact surface 306, of rock found in a hydrocarbon reservoir of interest, such as reservoir 144, are accessed. In one possible embodiment, the surface properties can be surface properties of a rock and/or a compartment where ion concentration is low and/or close to zero (such as, for example, a non-polar fluid such as oil, etc.). In one implementation, the surface properties can be accessed from a database of existing information. Alternately, the surface properties can be accessed by obtaining various samples from the reservoir.

In one possible embodiment, the surface properties can include a wide variety of geometrical and chemical properties of a rock in the reservoir including, for example, nature and concentration of charged groups on the surface, nano/micro scale roughness of the surface, etc.

In one possible implementation, techniques that can be used to examine rock properties include characterization experiments such as atomic force microscopy (AFM) techniques, x-ray photoelectron spectroscopy (XPS) techniques, surface Raman and other surface sensitive techniques, mass spectrometry and other analytical chemistry tools (to determine a chemical composition of the surface for example), crystallographic tools (such as X-ray diffraction etc.), to determine a structure of the rock/minerals, etc.

Calculations can be also used to examine rock properties. These can include, for example, molecular mechanics methods and quantum mechanics methods to interpret experimental results and refine a molecular-level structure of a surface of the rock.

In one possible implementation, one or more of the actions associated with this block 502 can be performed on the most abundant rock mineral in the reservoir.

At block 504, a chemical composition of oil found in the reservoir of interest can be accessed. In one possible implementation, the chemical composition of the oil (including, for example, concentrations and structures of compounds in the oil) can be accessed from a database of existing information. Alternately, the chemical composition of the oil can be accessed by obtaining various samples of the oil from the reservoir and performing various analyses.

In one possible implementation, the chemical composition of the oil can include information regarding compounds with charged and polar chemical groups (such as asphaltenes, aromatic and poly-aromatic carboxylic acids etc.) in the oil. In one possible aspect, the chemical composition of the oil can also include information regarding concentrations and structures of the compounds with charged and polar chemical groups. Various analytical chemistry and physical methods can be used for these purposes, including, for example, mass spectroscopy, Raman, infrared and vis-UV spectroscopy, chromatography etc.

At block 506, an ion effect on wettability of a contact surface of the rock, such as contact surface 306, is acquired. For example, in one possible implementation, one or more dominant ion effects on oil/water wettability of the surface can be determined. A combination of experimental techniques (including, for example, interfacial tension measurements, contact angle measurements, measurements of fluid flow, etc.) can be used for these purposes and be combined with molecular mechanics and/or quantum chemistry calculations.

In one possible embodiment, screening all possible combinations of ions can be avoided in favor of a search for a limited number of dominant effects. In one possible aspect this can be accomplished through testing of pairs of ions with differences in their properties such as e.g. small ions-large ions; low charge density ions-high charge density ions; monovalent ions-multivalent ions; etc. In some cases, such tests of ion pairs with differences in their properties can allow for a more expedient determination of one or more dominant effects of ions on the wettability properties of the mixture of oil and the tuned ion solution at the particular rock interface.

At block 508, a tuned ion solution can be formulated based on the ion effect on wettability of the contact surface of the rock to tune one or more surface properties of the rock as desired. Alternately, or additionally, in one possible implementation, the tuned ion solution can be formulated to tune interfacial properties between the oil and the tuned ion solution as desired. In one possible aspect, this can be accomplished by using the chemical composition of oil in the reservoir to determine an ion effect on an interfacial tension between the oil and the tuned ion solution. In such a manner a surface energy between the oil and the tuned ion solution can be increased and/or decreased as desired.

For example, in one possible embodiment, some or all of the results from blocks 502-506 can be used to engineer the tuned ion solution to affect interfacial properties of the rock-oil-tuned ion solution system in a desired way. Samples of reservoir fluid and reservoir rock can be used as can various experimental and/or computational models associated with the reservoir fluid and the reservoir rocks. In one possible embodiment, reservoir fluid includes any fluid found in the reservoir, such as water, oil, etc.

In another possible implementation, if ion exchange is desired, various ions can be added to the tuned ion solution to modify the properties of the contact surface. For instance, if the ions from the tuned ion solution that substitute for the surface ions have higher charge density than the surface ions they substitute, then the surface can become more polar and more water-wet. Alternatively, if the ions from the tuned ion solution that substitute for the surface ions have lower charge density than the surface ions they substitute, then the surface could become less polar and less water-wet.

In another possible implementation, if the formation of salt bridges is desired, ions can be added to the tuned ion solution that are effective in formation of salt bridges between charged groups on the surface and charged groups of oil components. This can increase oil wettability of the surface and in some cases block capillary pores through formation of supramoleculer aggregates on the surface from components of the oil being bound by the salt bridges.

If increased oil wettability is not desired, then in another possible implementation, various ions (such as, for example, $Ca^{2+}$) known to be active in terms of forming salt bridges ('bridge-active' ions) can be removed from the tuned ion solution. In one possible aspect, removed bridge active ions can be replaced in the tuned ion solution with ions that are passive in terms of forming the salt bridges (such as, for example, $K^+$).

In instances when removing one or more bridge active ions is not possible (e.g. the bridge active ions are already present in the reservoir fluid) the effect of the bridge active ions can be inhibited by adding chelating agents (i.e. chemicals that bind the bridge-active ions) such as, for example, citric acid, ethylenediaminetetraacetic acid or its sodium salt, etc., to the tuned ion solution.

In another possible implementation, if a local change of pH level is desired, then the pH of the tuned ion solution can be changed by adding acids (including inorganic acids such as HCl and/or organic acids like acetic acid, citric acid, etc.) or adding bases such as KOH, NaOH, etc.

In one possible embodiment, the nature of the counterions of the acids (anions) and bases (cations) can be taken into account while tuning the pH of the tuned ion solution. For example, K+ ions have a lower charge density than Na+ ions, and, consequently have lower binding affinity to carboxylic groups. Therefore, KOH at the same molar concentration as NaOH would lead to a lower rate of bridging together oil components with carboxylic groups.

In yet another possible embodiment, if competitive binding of ions to charged and/or polar groups is desired, ions can be added to the tuned ion solution that competitively bind the surface or oil components groups to prevent formation of supramolecular aggregates. In one possible aspect, this can decrease an affinity of oil components to the surface making the surface less oil-wet.

In one possible implementation, effects of tuning the tuned ion solution can be tested, for example using a test bed system. This can be done using a wide variety of techniques, including spontaneous imbibition, core flooding, interfacial tension measurements, wettability measurements, zeta potential measurements, etc.

FIG. 6 illustrates an example method 600 that can be employed to create a tuned ion solution, such as tuned ion solution 322, to alter a wetness of a surface, such as contact surface 306.

At block 602, one or more properties of rock in a hydrocarbon reservoir, such as reservoir 144, can be accessed. In one implementation, these properties can be accessed from a database of existing information. Alternately, the properties can be accessed by obtaining various samples from the reservoir.

In one possible embodiment, various properties of a rock surface present in the reservoir can be examined. These properties can include a wide variety of geometrical and chemical properties including, for example, nature and concentration of charged groups on the surface, nano/micro scale roughness of the surface, etc.

In one possible implementation, techniques that can be used to examine rock properties include experiments such as AFM, XPS, surface Raman and other surface sensitive techniques, mass spectrometry and other analytical chemistry tools (to determine a chemical composition of the surface for example), crystallographic tools (such as X-ray diffraction etc.), to determine a structure of the rock/minerals, etc. Calculations can be used to examine rock properties. These can include, for example, molecular mechanics methods and/or quantum mechanics methods to interpret experimental results and refine a molecular-level structure of a surface of the rock.

In one possible implementation, one or more of the actions associated with this block 602 can be performed on the most abundant rock mineral in the reservoir.

At block 604, an ion effect on wettability of a surface of the rock can be acquired. In one possible implementation, one or more dominant ion effects on oil/water wettability of the rock surface can be determined. In one aspect, a combination of experimental techniques (including, for example, interfacial tension measurements, contact angle measurements, measurements of fluid flow, etc.) can be used for these purposes and be combined with molecular mechanics and quantum chemistry calculations.

In one possible embodiment, screening all possible combinations of ions can be avoided in favor of a search for a limited number of dominant effects that can be carried out through testing of pairs of ions with differences in their properties such as e.g. small ions-large ions; low charge density ions-high charge density ions; monovalent ions-multivalent ions; etc. In some cases, such tests of ion pairs with differences in their properties can allow for a more expedient determination of one or more dominant effects of ions on the wettability properties of the mixture of oil and the tuned ion solution at the particular rock interface.

At block 606, a tuned ion solution is formulated with a content of direct contact ions sufficient to increase a water wetness of the surface of the rock. For example, in one possible embodiment, some or all of the results from blocks 602-604 can be used to engineer the tuned ion solution to affect interfacial properties of the rock-oil-tuned ion solution system in a desired way. Samples of reservoir fluid and reservoir rock can be used as can various experimental and/or computational models associated with the reservoir fluid and the reservoir rocks. In one possible embodiment, reservoir fluid includes any fluid found in the reservoir, such as water, oil, etc.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

The invention claimed is:

1. A method of tuning an injection fluid comprising:
accessing charged group concentration on a contact surface of rock found in a hydrocarbon reservoir of interest;
accessing a charged group concentration in oil found in the reservoir of interest;
acquiring an ion effect on wettability of the contact surface of the rock;
formulating a tuned ion solution to adjust a surface energy between the oil and the tuned ion solution to modify one or more surface properties of the rock, wherein formulating the tuned ion solution comprises adjusting the ion effect on wettability of the contact surface of the rock and at least one selected from a group consisting of the charged group concentration on the contact surface of the rock and the charged group concentration in the oil; and
including in the tuned ion solution, ions with a static polarizability larger than a preset limit to influence wettability of the contact surface of the rock.

2. The method of claim 1, wherein accessing the charged group concentration on the contact surface of the rock is based on a most abundant type of rock found in the hydrocarbon reservoir of interest.

3. The method of claim 1, wherein accessing the charged group concentration on the contact surface of the rock and in the oil includes accessing one or more of:
geometrical surface properties of the rock; and
chemical surface properties of the rock.

4. The method of claim 1, wherein accessing the charged group concentration on the contact surface of the rock and in the oil includes performing characterization experiments on the rock.

5. The method of claim 1, wherein accessing the charged group concentration on the contact surface of the rock and in the oil comprises determining chemical composition of the oil using one or more of:
analytic chemistry methods;
physical methods; and
spectroscopic methods.

6. The method of claim 1, wherein the acquiring includes determining the ion effect using one or more of:
experimental techniques;
molecular mechanics; and
quantum chemistry.

7. The method of claim 1, wherein the acquiring includes acquiring one or more dominant ion effects on wettability of the contact surface of the rock.

8. The method of claim 1, wherein the formulating includes adding ions to the tuned ion solution to encourage preferential adsorption of the ions on the contact surface of the rock to decrease interaction energy between oil chemical species and the contact surface of the rock.

* * * * *